(12) United States Patent
Alvarez et al.

(10) Patent No.: US 12,070,945 B2
(45) Date of Patent: Aug. 27, 2024

(54) SYSTEM AND METHOD FOR VARYING EJECTED INK DROP VOLUMES TO IMPROVE INK IMAGE QUALITY IN AN INKJET PRINTER

(71) Applicant: Xerox Corporation, Norwalk, CT (US)

(72) Inventors: Jorge A. Alvarez, Penfield, NY (US);
Jason M. LeFevre, Webster, NY (US);
Seemit Praharaj, Webster, NY (US);
Chu-Heng Liu, Penfield, NY (US);
Douglas K. Herrmann, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 187 days.

(21) Appl. No.: 17/806,212

(22) Filed: Jun. 9, 2022

(65) Prior Publication Data
US 2023/0398778 A1    Dec. 14, 2023

(51) Int. Cl.
| *G06T 7/13* | (2017.01) |
| *B41J 2/125* | (2006.01) |
| *B41J 2/21* | (2006.01) |
| *G06T 7/00* | (2017.01) |

(52) U.S. Cl.
CPC ............. *B41J 2/125* (2013.01); *B41J 2/2132* (2013.01); *G06T 7/0004* (2013.01); *G06T 7/13* (2017.01); *G06T 2207/30144* (2013.01)

(58) Field of Classification Search
CPC .................................................. B41J 2/04516
See application file for complete search history.

(56) References Cited

U.S. PATENT DOCUMENTS

| 5,369,428 | A | * | 11/1994 | Maze .................... B41J 2/5056 |
| | | | | 400/323 |
| 5,661,507 | A | * | 8/1997 | Sperry ................. G06K 15/107 |
| | | | | 347/9 |
| 6,406,111 | B1 | | 6/2002 | Klassen et al. |
| 7,639,891 | B2 | | 12/2009 | Loce et al. |
| 8,619,332 | B2 | | 12/2013 | Karito et al. |
| 2003/0132975 | A1 | * | 7/2003 | Xie ....................... B41J 19/145 |
| | | | | 347/5 |
| 2012/0019589 | A1 | | 1/2012 | Gila et al. |
| 2012/0236052 | A1 | | 9/2012 | Tobita et al. |
| 2014/0285546 | A1 | | 9/2014 | Furuta |
| 2014/0375713 | A1 | * | 12/2014 | Shimoda ............. B41J 2/04588 |
| | | | | 347/9 |
| 2017/0050433 | A1 | * | 2/2017 | Kammerzell ...... G06K 15/1822 |
| 2021/0101385 | A1 | * | 4/2021 | Ino ........................ H04N 1/4092 |

FOREIGN PATENT DOCUMENTS

WO    WO-2014000801 A1 *    1/2014    .......... B41J 2/04516

* cited by examiner

*Primary Examiner* — Shelby L Fidler
(74) *Attorney, Agent, or Firm* — Maginot Moore & Beck LLP

(57) ABSTRACT

A method of operating a printer identifies image areas and image features in ink image content data that are likely to produce ink blur within an ink image. The ink image content data for these areas and features is modified to attenuate the appearance of ink blur. The image areas identified as being likely to produce ink blur are the trailing edge and the side edges of the ink image content data. The modification of the ink image content data for the features and predetermined areas improves the quality of the printed ink image.

10 Claims, 10 Drawing Sheets

SYSTEM AND METHOD FOR VARYING EJECTED INK DROP VOLUMES TO IMPROVE INK IMAGE QUALITY IN AN INKJET PRINTER

TECHNICAL FIELD

This disclosure relates generally to devices that produce ink images on media, and more particularly, to the production of ink drops from inkjets in such devices during printing.

BACKGROUND

Inkjet imaging devices, also known as inkjet printers, eject liquid ink from printheads to form images on an image receiving surface. The printheads include a plurality of inkjets that are arranged in an array. Each inkjet has a thermal or piezoelectric actuator that is coupled to a printhead controller. The printhead controller generates firing signals that correspond to digital data content corresponding to images. The actuators in the printheads respond to the firing signals by expanding into an ink chamber to eject ink drops onto an image receiving surface and form an ink image that corresponds to the digital image content used to generate the firing signals. The image receiving surface is usually a continuous web of media material or a series of media sheets.

Inkjet printers used for producing color images typically include multiple printhead assemblies. Each printhead assembly includes one or more printheads that typically eject a single color of ink. In a typical inkjet color printer, four printhead assemblies are positioned in a process direction with each printhead assembly ejecting a different color of ink. The four ink colors most frequently used are cyan, magenta, yellow, and black. The common nomenclature for such printers is CMYK color printers. Some CMYK printers have two printhead assemblies that print each color of ink. The printhead assemblies that print the same color of ink are offset from each other by one-half of the distance between adjacent inkjets in the cross-process direction to double the number of pixels per inch density of a line of the color of ink ejected by the printheads in the two assemblies. As used in this document, the term "process direction" means the direction of movement of the image receiving surface as it passes the printheads in the printer and the term "cross-process direction" means a direction that is perpendicular to the process direction in the plane of the image receiving surface.

Image quality in color inkjet printers depends upon on many factors such as ink chemistry, printhead technology, thermals in the vicinity of the ink drops, print process setpoints, airflows, and ink-to-media spreading and drying interactions. One issue that degrades image quality is the separation of the ink drops during the flight time from the inkjet nozzles to the ink receiving surface. When the ink drop is first ejected from a nozzle it is elongated and during the flight of the ink drop, the lead end and the tail end of the drop merge to form a coherent drop. Sometimes, however, the elongated portions of the drop separate from the leading end of the drop and produce satellite drops. These satellite drops tend to land outside of the landing area for the major portion of the ink drop that cohered before landing. FIG. 8 shows where the smaller satellites land within the empty portion of the letters "b" and near their edges. These satellites can blur characters and other symbols printed on media and adversely impact the quality of printed ink images. As used in this document, the terms "satellites" and "ink satellites" mean portions of ink drops ejected from inkjets in a printhead that do not cohere to the drop from which they separated before the drop lands. As used in this document, "ink blur" means the presence of ink satellites in areas other than where the ink drop from which the satellites were produced landed. Reducing the probability of ink satellite production during ink image printing would be beneficial.

SUMMARY

A color inkjet printer is configured to vary the volumes of the ejected ink drops in the vicinity of predetermined areas of an ink image and certain types of features in the image being formed by the ink drops. The color inkjet printer includes at least one printhead and a controller operatively connected to the at least one printhead. The controller is configured to analyze ink image content data to identify ink image features in the ink image content data that have trailing edges followed by white space of a predetermined length in the process direction, modify the ink image content data in the trailing edges of the identified ink image features, and modify the ink image content in predetermined areas of the ink image content data.

A method of operating a color inkjet printer varies the volumes of the ejected ink drops in the vicinity of predetermined areas of an ink image and certain types of features in the image being formed by the ink drops. The method of operating a color inkjet printer includes analyzing ink image content data to identify ink image features in the ink image content data that have trailing edges followed by white space of a predetermined length in the process direction, modifying the ink image content data in the trailing edges of the identified ink image features, and modifying the ink image content in predetermined areas of the ink image content data.

BRIEF DESCRIPTION OF THE DRAWINGS

The foregoing aspects and other features of a color inkjet printer and color inkjet printer operational method that varies the volumes of the ejected ink drops in the vicinity of predetermined areas of an ink image and certain types of features in the image being formed by the ink drops are explained in the following description, taken in connection with the accompanying drawings.

DETAILED DESCRIPTION

Figure 1:
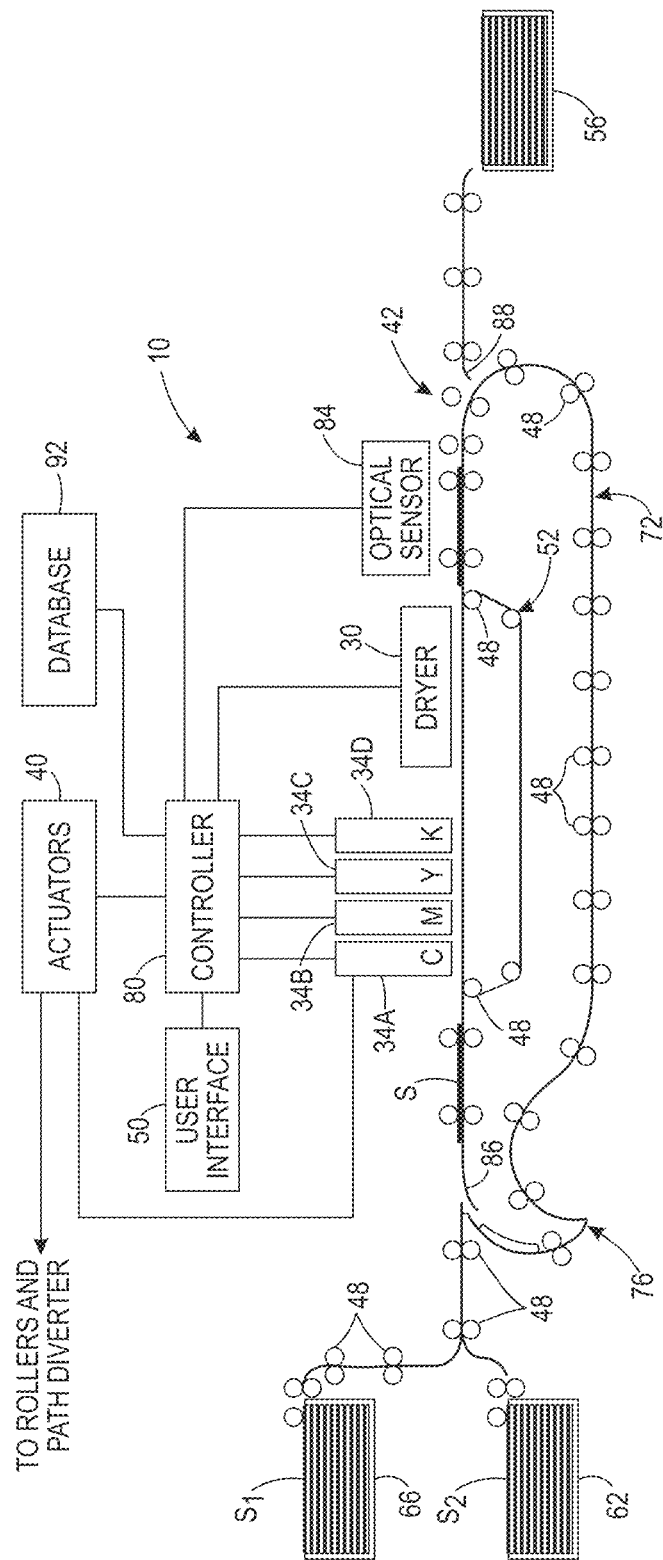
FIG. 1 is a schematic drawing of a color inkjet printer that is configured to vary the volumes of the ejected ink drops in the vicinity of predetermined areas of an ink image and certain types of features in the image being formed by the ink drops.

For a general understanding of the environment for the printer and the printer operational method disclosed herein as well as the details for the printer and the printer operational method, reference is made to the drawings. In the drawings, like reference numerals have been used throughout to designate like elements. As used herein, the word "printer" encompasses any apparatus that ejects ink drops onto media to form ink images.

The printer and method described below select different drop volumes to form a portion of an ink image with reference to the edges of image features within the portion of the image or predetermined areas of the ink image on the media. Specifically, the ink image content data for trailing and side edge areas of ink images and the trailing edge areas of image features bordering white space are modified to reduce the volumes of the ink drops ejected into those areas. The smaller ink drops reduce the likelihood that ink satellites are produced and land in white space adjacent to the areas or features. Previously known printers that address ink blur process the ink image content data for an entire ink image and modify the ink image content data for any pixel that is immediately adjacent to a pixel of white space in any direction. While this method addresses ink blur within the white space of textual characters or other graphic features, it is computationally intensive and time consuming. The system disclosed herein modifies ink image content data for pixels in predetermined areas of the ink image data only and for pixels in the trailing edges of ink image features to attenuate the likelihood that ink satellites are produced in these predetermined and identified areas. The processing burden to achieve these goals is significantly less.

FIG. 1 depicts a high-speed color inkjet printer 10 that is configured to vary the volumes of ink drops in predetermined areas and the trailing edges of features adjacent to white space within ink images. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprises a portion of the media transport 42 that passes through the print zone PZ (shown in FIG. 2) of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

Figure 2:
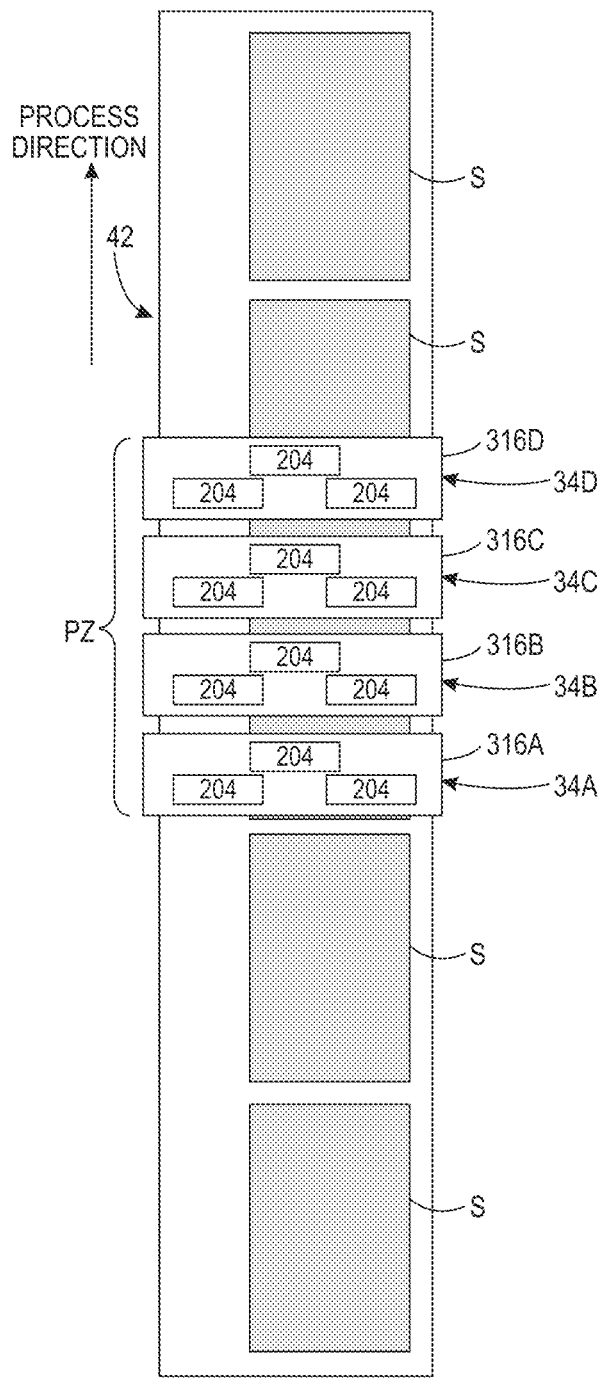
FIG. 2 depicts the print zone in the printer of FIG. 1.

The print zone PZ in the printer 10 of FIG. 1 is shown in FIG. 2. The print zone PZ has a length in the process direction commensurate with the distance from the first inkjets that a sheet passes in the process direction to the last inkjets that a sheet passes in the process direction and it has a width that is the maximum distance between the most outboard inkjets on opposite sides of the print zone that are directly across from one another in the cross-process direction. Each printhead module 34A, 34B, 34C, and 34D shown in FIG. 2 has three printheads 204 mounted to one of the printhead carrier plates 316A, 316B, 316C, and 316D, respectively.

As shown in FIG. 1, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the media transport 42 after a substrate has been printed and move it by the rotation of rollers in an opposite direction to the direction of movement past the printheads. At position 76 in the duplex path 72, the substrate can be turned over so it can merge into the job stream being carried by the media transport 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 1, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80. The controller 80 is configured to detect streakiness in the printed images on the media sheets of a print job. Additionally, sheets that are printed with test pattern images are inserted at intervals during the print job. These test pattern images are analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the right mass or landing at an errant position is called an inoperative inkjet in this document. The controller can store data identifying the inoperative inkjets in database 92 operatively connected to the controller. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located. The optical sensor can be a digital camera, an array of LEDs and photodetectors, or other devices configured to generate image data of a passing surface. As already noted, the media transport also includes a duplex path that can turn a sheet over and return it to the media transport prior to the printhead modules so the opposite side of the sheet can be printed. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image content data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, ink image content data for an ink image to be produced is sent to the controller 80 from either a scanning system or an online or work station connection. The ink image content data is processed to generate the inkjet ejector firing signals delivered to the printheads in the modules 34A-34D. Along with the ink image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "ink image content data" means digital data that identifies a color and a volume of each ejected ink drop that forms pixels in an ink image to be printed on a media sheet.

Figure 8:
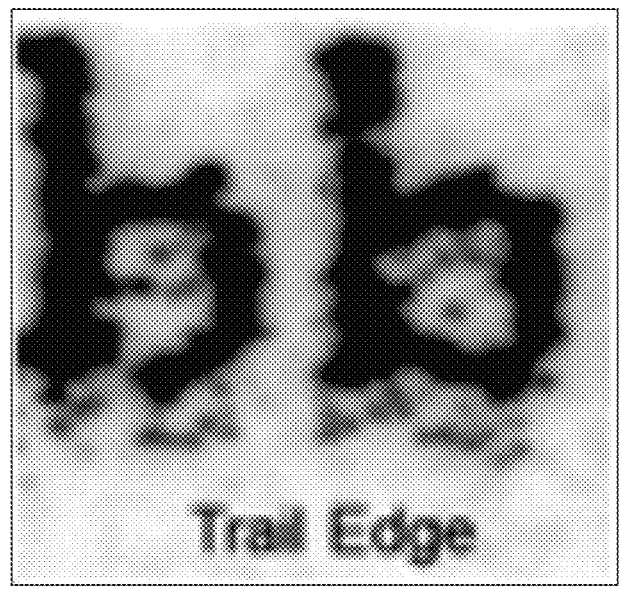
FIG. 8 illustrates the impact of ink drop satellites on the clarity of a pair of printed characters.
Figure 9:
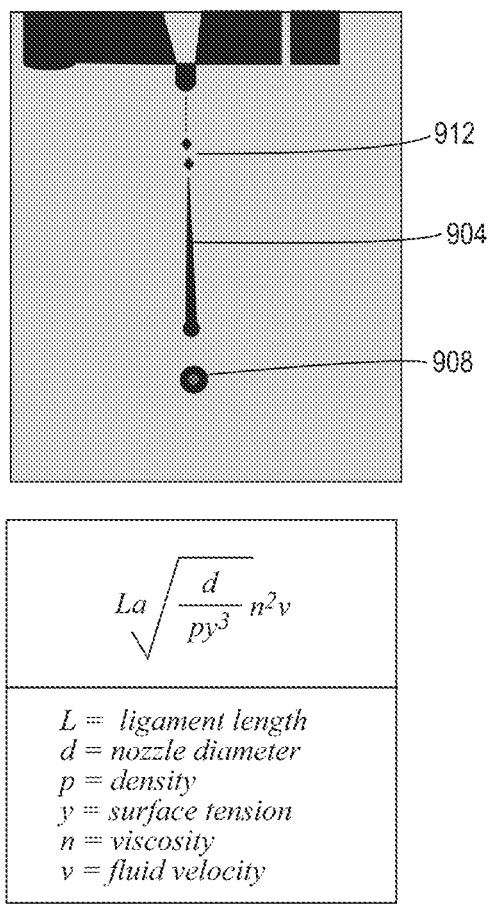
FIG. 9 illustrates a ligament of an ejected ink drop and the parameters that affect its length.

FIG. 9 shows an ejected ink drop shortly after ejection from an inkjet nozzle. An elongated portion of the ink drop, sometimes called a ligament 904, has separated from the lead spherical portion of the drop 908 and the trailing end of the drop 912. As shown by the formula in the figure, the length of this ligament 904 is proportional to the product of the nozzle diameter, the square of the ink viscosity, and the velocity of the ink divided by the product of the density and the cube of the surface tension. The longer the length of the ligament, the higher the probability that the ligament fractures and forms satellites. These satellites behave across the print gap differently than the larger well-formed drops before they land on the media. Their velocity loss is greater, their momentum is lower, and their susceptibility to airflows is higher among other factors. These satellites contribute to the image blur such as that shown in FIG. 8. The parameters affecting ligament length shown in FIG. 9 suggests that if all of the parameters except drop diameter are constant, then larger drop diameters form longer ligaments that are more likely to fracture into satellites. Ink drop diameter is a function of the volume of the ink drop. Therefore, smaller volume ink drops produce shorter ligaments that retract into the head of the ink drop in mid-air and are less likely to produce satellites before landing on the media.

Figure 3:
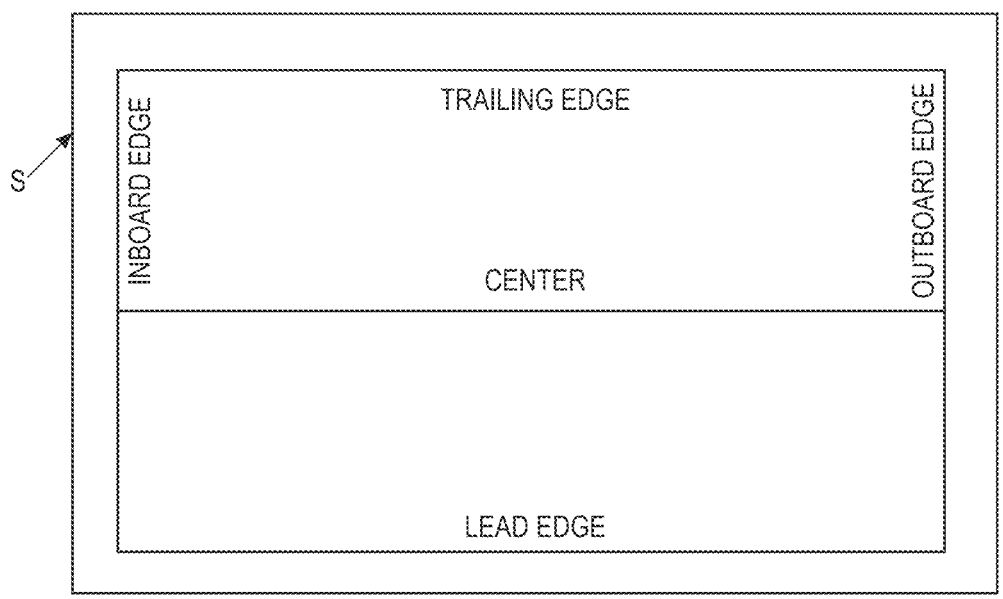
FIG. 3 is a target used to determine ink image areas on a media sheet where ink blur occurs.
Figure 4A:
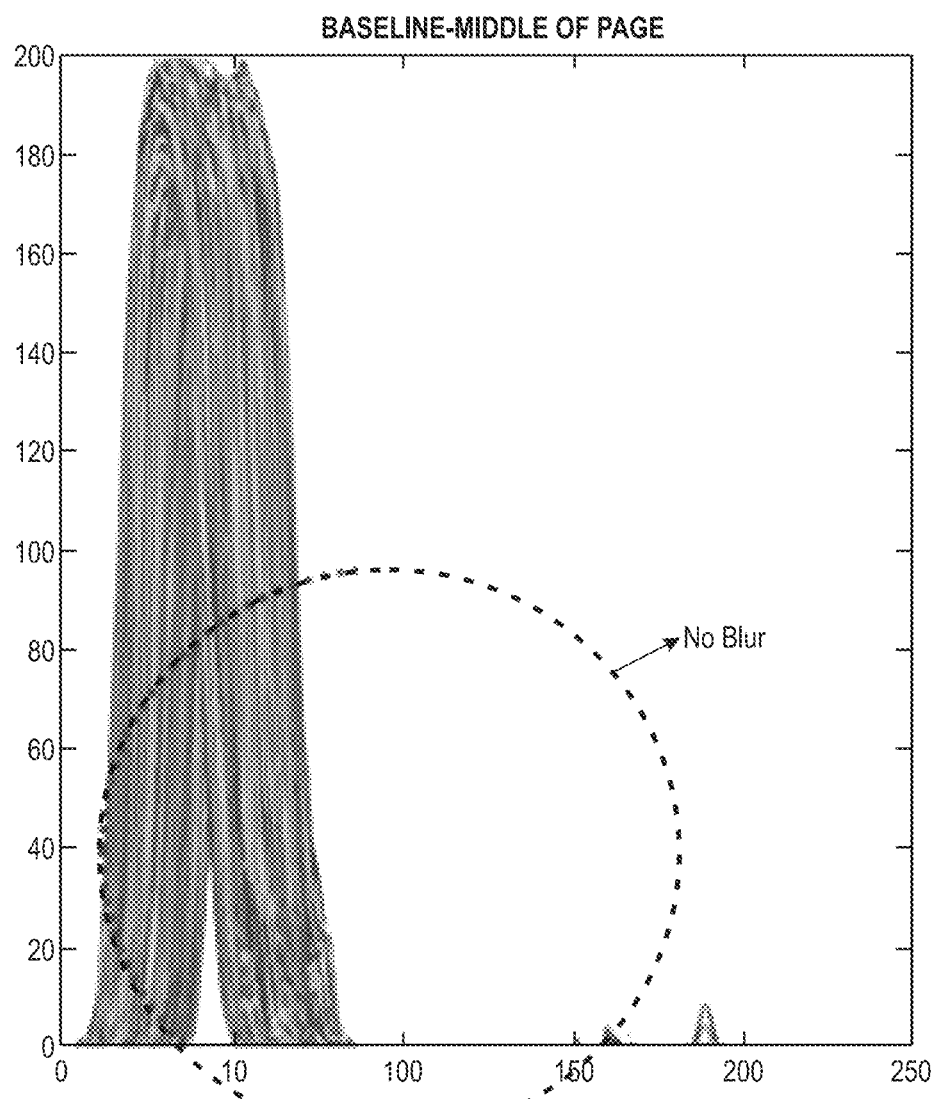
FIG. 4A is a graph of the ink in the area of the center line printed in the target of FIG. 3
Figure 4B:
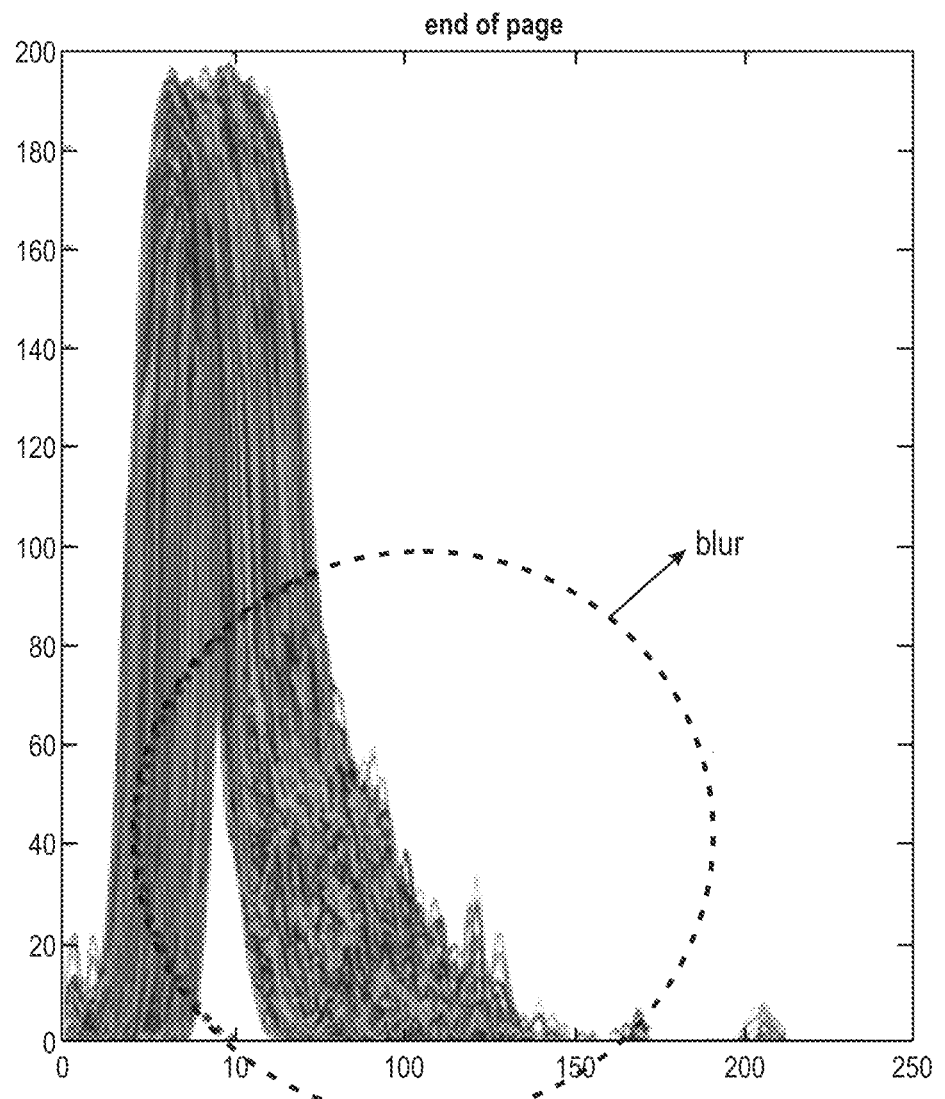
FIG. 4B is a graph of the ink in the area of the trailing edge line printed in the target of FIG. 3.

Rather than make all of the ink drops smaller and increase the frequency of the ink drop ejections for all of the pixels in an ink image, an empirical analysis reveals that the environmental conditions in particular areas of an ink image are more susceptible to the production of satellites that can cause ink blur. Specifically, a target, as shown in FIG. 3, is printed to evaluate ink blur across all edges of the media sheet. The target consists of nine pixel lines printed at ~55% fill along all edges of the paper and along one pixel line at the center of the sheet to establish a baseline. The printed image is scanned by the optical sensor 84 and every scanned pixel of the center line is plotted to produce the graph shown in FIG. 4A. As the center line approaches a position opposite the sensor 84, satellites and deviating ink drops are imaged since the resolution of the sensor 84 is significantly higher than the length of a single pixel in the process direction. That is, as the center line approaches, the sensor begins to detect the satellites and other ink drops that land on either side of the center line in the process direction. Thus, the digital image data of the center line produces multiple lines in the process direction and each of these lines extends in the cross-process direction. The grayscale values detected by the sensor in the cross-process direction form each one of the multiple lines in the process direction that correspond to the center line. As can be seen in the graph of FIG. 4A, the pixel grayscale values for these multiple lines are evenly distributed about the peak value at the center of the center line. FIG. 4B is a graph of every scanned pixel of the nine line edges printed in the process direction for the trailing edge of the target of FIG. 3. The leading edge of the trailing edge lines look similar to the leading portion of the center line in FIG. 4A. The trailing portion of the trailing edge line, however, is not as coherent because the airflow at the trailing edge of the media sheet disrupts the flight paths of the ejected ink drops and satellites produced from the ligaments of the ejected ink drops. A comparison of these two graphs demonstrates that ink blur occurs at the trailing edges of printed media sheets. Similar graphs for the inboard and outboard lines show that the airflows in these areas are disruptive as well.

Figure 5:
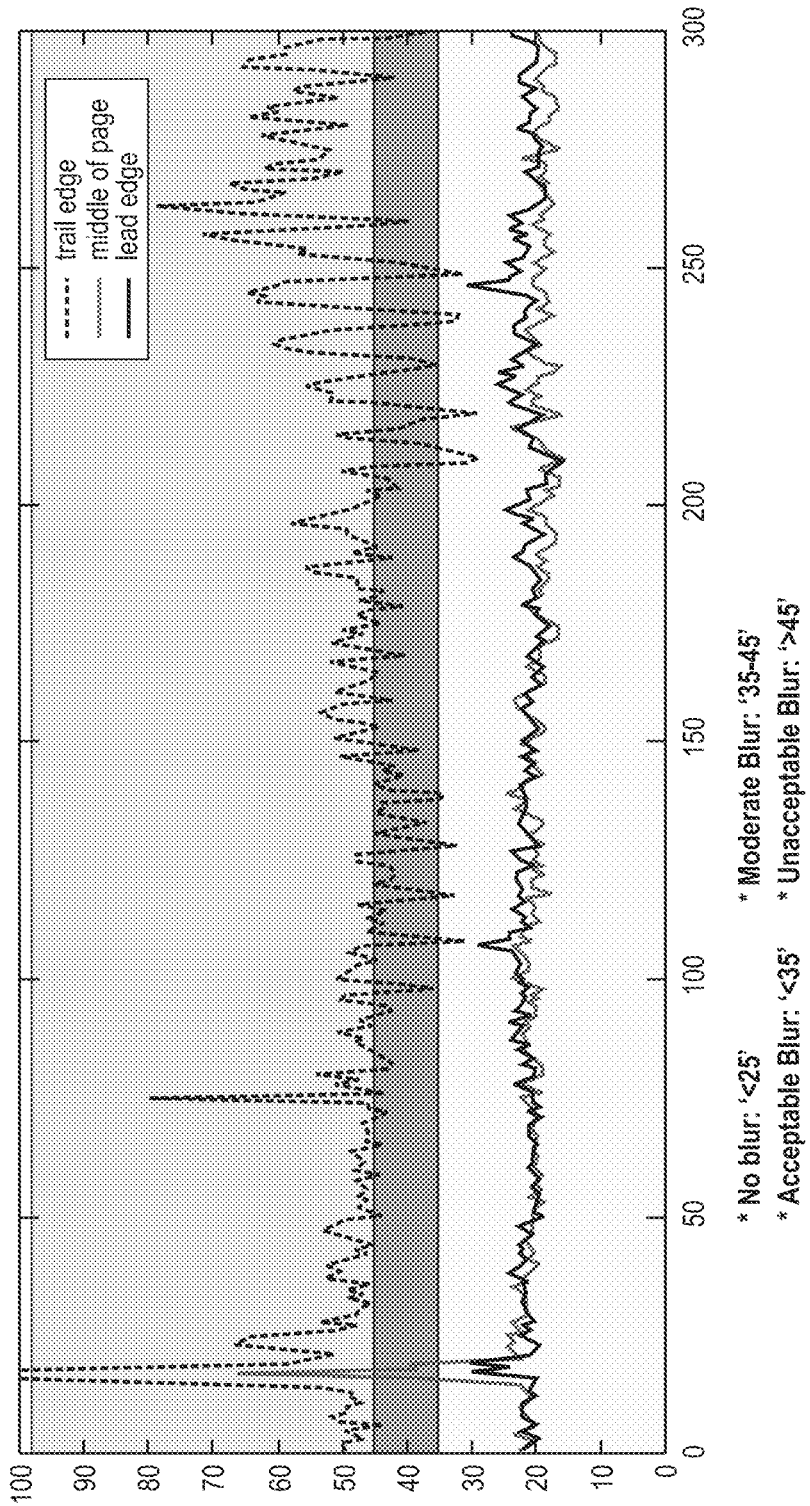
FIG. 5 is a graph identifying areas of acceptable and unacceptable ink blur based on the graphs of FIG. 4A and FIG. 4B.

An appropriate threshold of 80 on the grayscale was established for the ejected black ink and every scanned line imaged by the sensor 84 below that threshold is counted to identify satellites that have landed in an area other than where the main part of the ink drop landed. Appropriate thresholds for other colors can also be determined empirically. The identification of these satellites establishes the degree of ink blur. A rolling average over the length of the page is correlated to visual blur and yields the domains of acceptability and unacceptability ink blur depicted in the graph of FIG. 5. The graph is of an ink image in the cross-process direction as it passes the sensor 84. As can be observed from this figure, the trailing edge of a typical printed ink image is within the unacceptable ink blur range, while the leading edge and center line are within the acceptable and moderate ink blur domains except at the inboard and sometimes the outboard edges. These measurement results identify trailing edges and the side edges of ink images as requiring some type of ink blur compensation that does not require analysis of ink image content data during printing. One method of compensation for these predetermined ink image areas is to reduce the volume of the drops ejected into these areas so they have shorter ligaments and produce fewer satellites.

Figure 6:
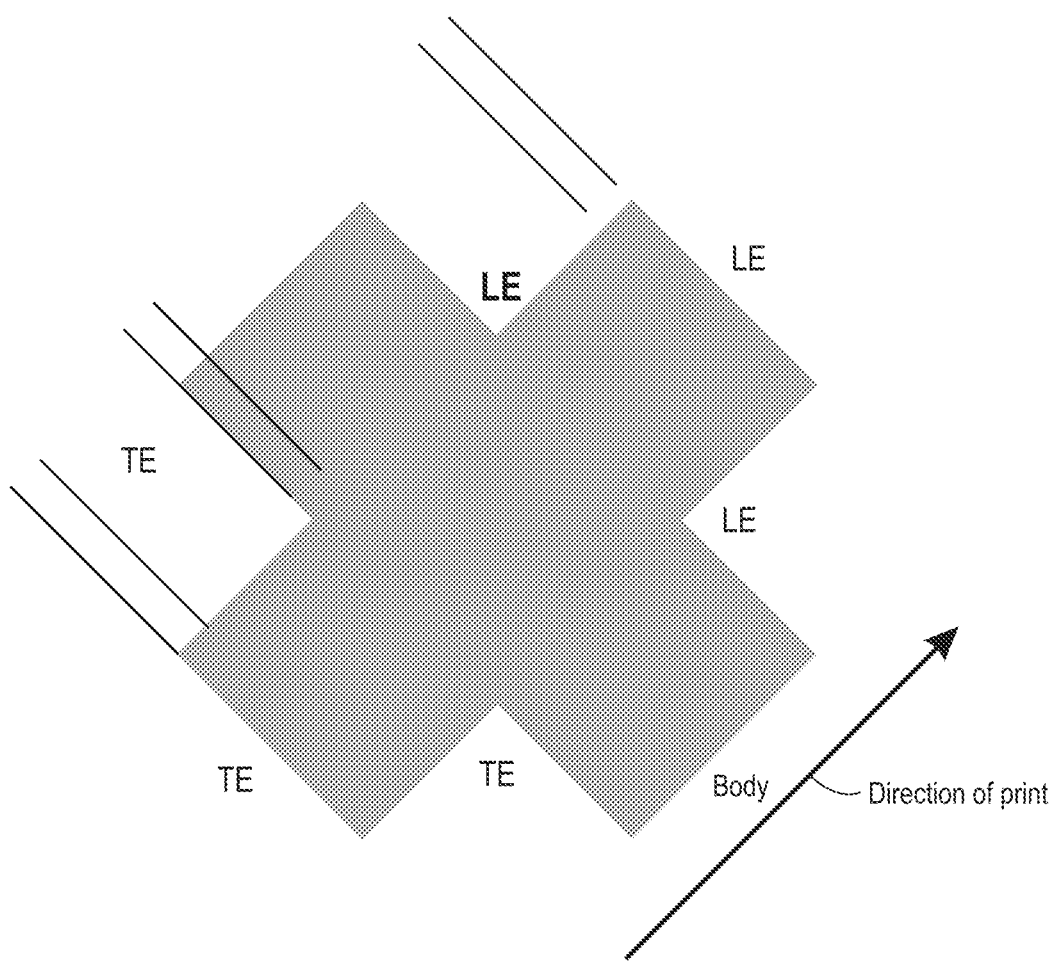
FIG. 6 illustrates an ink image on a media sheet and the leading edges and trailing edge areas of features within the ink image.

In addition to the problematic areas for ink blur identified in the process discussed above, some image features within the ink image but not near the media edges can produce ink blur that is in the unacceptable range. Empirical analysis of target images reveals that the trailing edges of image features that are at least 2 to 3 mm long in the cross-process direction that are also followed by a blank media space that is approximately 2 to 3 mm in the process direction are susceptible to producing ink blur. The image shown in FIG. 6 provides examples of such ink image features having multiple leading and trailing edges that are identified by the parallel lines in the figure. The ink image content data is analyzed before generating the pixels used to operate the ink ejectors to identify these types of features in the ink image having trailing edges that are susceptible to ink blur.

Figure 7:
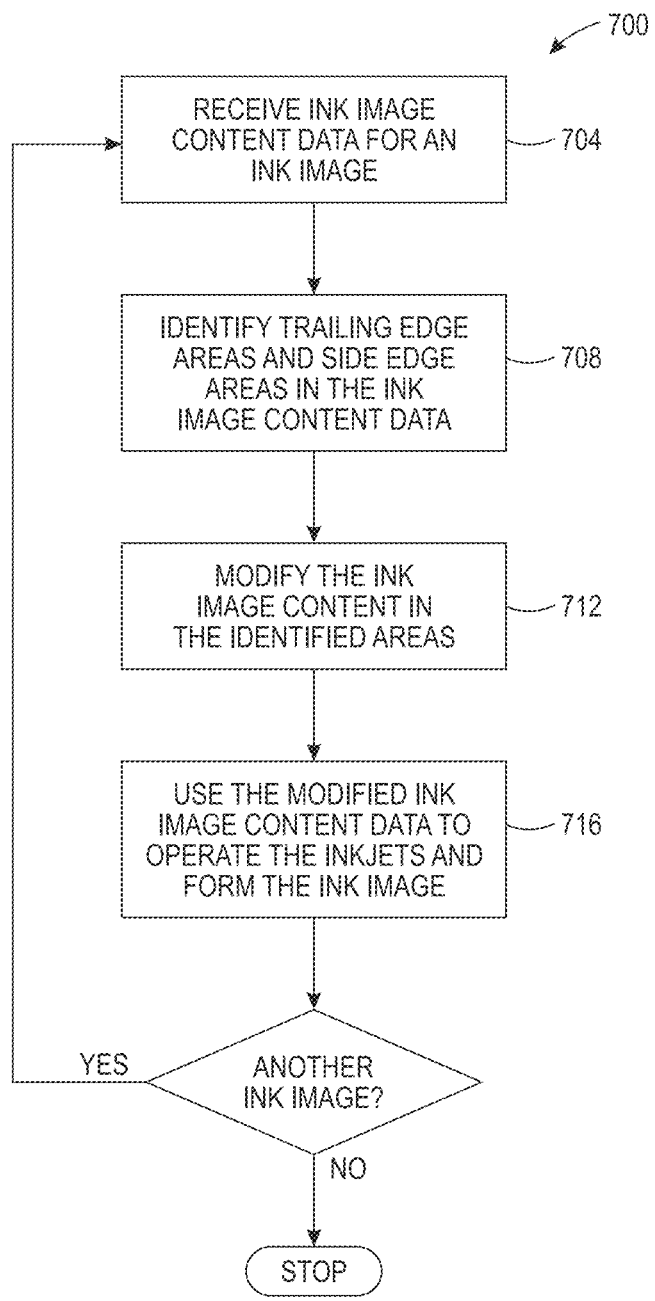
FIG. 7 is a flow diagram of a process for operating the printer of FIG. 1 to reduce ink blur in the ink image produced by the printer.

FIG. 7 depicts a flow diagram for a process 700 that analyzes ink image content data to identify ink image features that are sufficiently long in the cross-process direction and followed by white space of a predetermined length in the process direction. The process then modifies the ink image content data of the predetermined side edge areas, the trailing edge area, and the identified features to operate the inkjets in the printer to eject smaller volume ink drops in those areas and features. In one embodiment, the ink image content data in those identified areas and features is modified to eject ink drops having a volume that is less than would be otherwise ejected. The process described below modifies the ink image content data within nine columns of an outboard edge and within nine columns of an inboard edge in the cross-process direction, and within nine rows of the trailing edge of the ink image in the process direction. In the discussion below, a reference to the process 700 performing a function or action refers to the operation of a controller, such as controller 80, to execute stored program instructions to perform the function or action in association with other components in the printer. The process 700 is described as being performed with the printer 10 of FIG. 1 for illustrative purposes.

The process 700 of operating the printer 10 begins with the reception of the image content data for an ink image to be printed (block 704). The areas of trailing edges, side edges, and features with problematic trailing edges are identified (block 708). The ink image content data of the identified areas are modified (block 712). The modified ink image content data is used to operate the inkjets by generating ejector firing signals that cause the inkjets to eject smaller ink drop volumes than the original ink image content data would have caused the inkjets to eject (block 716). Printing continues in this manner until the last ink image is printed (block 720). At that point, the process is finished.

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. An inkjet printer comprising:
   at least one printhead; and
   a controller operatively connected to the at least one printhead, the controller being configured to:
      analyze ink image content data to identify ink image features in an ink image to be formed by the inkjet printer using the ink image content data that have trailing edges followed by white space of a predetermined length in a process direction;
      modify the ink image content data in the trailing edges of the identified ink image features; and
      modify the ink image content data within a predetermined number of columns of each side edge in a cross-process direction and within a predetermined number of rows from a trailing edge of the ink image to be formed by the inkjet printer using the ink image content data.

2. The inkjet printer of claim 1, the controller being further configured to modify the ink image content data in the trailing edges of the identified ink image features and the ink image content data within the predetermined columns of each side edge of the ink image and within the predetermined number of rows of the trailing edge of the ink image to reduce a volume of ink ejected when the modified ink image content data is used to operate inkjets in the at least one printhead.

3. The inkjet printer of claim 1 wherein each side edge of the ink image are
   within at least nine columns in the cross-process direction from an outboard side edge of the ink image and within at least nine columns in the cross-process direction of an inboard side edge of the ink image.

4. The inkjet printer of claim 3, the controller being further configured to:
   modify the ink image content data within at least nine rows in the process direction preceding the trailing edge of the ink image.

5. The inkjet printer of claim 1, the controller being further configured to:

operate inkjets in the at least one printhead using the modified ink image content data to form portions of the ink image within the predetermined number of columns from each side edge, the portion within the predetermined number of rows preceding the trailing edge, and the identified ink image features.

6. A method of operating an inkjet printer comprising:
analyzing ink image content data to identify ink image features in the ink image content data that have trailing edges followed by white space of a predetermined length in a process direction;
modifying the ink image content data in the trailing edges of the identified ink image features; and
modifying the ink image content data within a predetermined number of columns of each side edge in a cross-process direction and within a predetermined number of rows from a trailing edge of the ink image to be formed by the inkjet printer using the ink image content data.

7. The method of claim 6 further comprising:
modifying the ink image content data in the trailing edges of the identified ink image features and the ink image content data within the predetermined columns of each side edge of the ink image and within the predetermined number of rows of the trailing edge of the ink image to reduce a volume of ink ejected when the modified ink image content data is used to operate inkjets in at least one printhead of the inkjet printer.

8. The method of claim 7 wherein the predetermined number of columns is at least nine columns and the side edges are an outboard edge and an inboard edge of the ink image.

9. The method of claim 7 wherein the predetermined number of rows is at least nine columns.

10. The method of claim 6 further comprising:
using the modified ink image content data to operate inkjets in at least one printhead of the inkjet printer to form portions of the ink image within the predetermined number of columns from each side edge, the portion within the predetermined number of rows preceding the trailing edge, and the identified ink image features.

\* \* \* \* \*